United States Patent
Moon et al.

(10) Patent No.: US 7,295,694 B2
(45) Date of Patent: Nov. 13, 2007

(54) MICR-BASED OPTICAL CHARACTER RECOGNITION SYSTEM AND METHOD

(75) Inventors: Rodney G. Moon, Charlotte, NC (US); Ravi Prakash, Concord, NC (US)

(73) Assignee: International Business Machines Corporation, Armonk, NY (US)

(*) Notice: Subject to any disclaimer, the term of this patent is extended or adjusted under 35 U.S.C. 154(b) by 730 days.

(21) Appl. No.: 10/081,417

(22) Filed: Feb. 22, 2002

(65) Prior Publication Data

US 2003/0161523 A1 Aug. 28, 2003

(51) Int. Cl.
*G06K 9/00* (2006.01)
*G06K 7/10* (2006.01)
*G06K 7/08* (2006.01)
*G06Q 40/00* (2006.01)

(52) U.S. Cl. .................. 382/140; 235/379; 235/454; 235/449

(58) Field of Classification Search .............. 382/139, 382/140, 137; 235/379; 705/45
See application file for complete search history.

(56) References Cited

U.S. PATENT DOCUMENTS

| | | | |
|---|---|---|---|
| 3,582,571 A | 6/1971 | Sprott et al. | |
| 3,591,733 A | 7/1971 | Pflughaupt | |
| 3,949,363 A | 4/1976 | Holm | |
| 4,262,589 A | 4/1981 | Gebhardt | |
| 4,315,246 A | 2/1982 | Milford | |
| 4,425,626 A | 1/1984 | Parmet et al. | |
| 4,457,015 A * | 6/1984 | Nally et al. | 382/174 |
| 4,490,850 A * | 12/1984 | Nally et al. | 382/196 |
| 4,876,735 A | 10/1989 | Martin et al. | |
| 5,026,974 A | 6/1991 | Franklin et al. | |
| 5,091,968 A * | 2/1992 | Higgins et al. | 382/220 |
| 5,308,959 A | 5/1994 | Cherry | |
| 5,469,241 A | 11/1995 | Takahashi et al. | |
| 5,895,904 A | 4/1999 | Nissim | |
| 6,195,453 B1 * | 2/2001 | Simonoff | 382/137 |
| 6,243,504 B1 | 6/2001 | Kruppa | |
| 6,654,487 B1 * | 11/2003 | Downs, Jr. | 382/139 |
| 2002/0051562 A1 * | 5/2002 | Sheppard et al. | 382/137 |
| 2003/0059099 A1 * | 3/2003 | Tateishi | 382/139 |

FOREIGN PATENT DOCUMENTS

JP 6018996 A 1/1994

OTHER PUBLICATIONS

Lancto, D. C., "Simple Optical Feedback for MICR E13B Encoder," IBM Technical Disclosure Bulletin, vol. 20, No. 1, pp. 241-243, Jun. 1977.

* cited by examiner

*Primary Examiner*—Andrew W. Johns
*Assistant Examiner*—Anthony Mackowey
(74) *Attorney, Agent, or Firm*—Douglas A. Lashmit; Hoffman, Warnick & D'Alessandro LLC

(57) ABSTRACT

A character recognition system and method. The system comprises an (OCR) optical character reader system for collecting character data by electro-optically scanning printed characters; a conversion system for converting the character data to a Magnetic Ink Character Recognition (MICR) format; and a recognition engine for interpreting the converted character data using a MICR algorithm.

19 Claims, 2 Drawing Sheets

MICR-BASED OPTICAL CHARACTER RECOGNITION SYSTEM AND METHOD

BACKGROUND OF THE INVENTION

1. Technical Field

The present invention relates generally to character recognition systems, and relates more particularly to an optical character recognition system for reading E13B character data utilizing a MICR-based algorithm.

2. Related Art

Various applications require the automated processing of materials having printed characters. One common application involves the processing of checks by, e.g., a bank, a cashier at a retail store, etc. A popular technology for processing checks reads a set of special characters at the bottom of the check, which are called Magnetic Ink Character Recognition (MICR) characters. These characters are generally printed in a font referred to as E13B, and contain information regarding account number, routing numbers, etc. To implement such a system, the characters are printed in a magnetic ink so that the characters can be read magnetically. Accordingly, MICR technology is limited to applications that utilize magnetic ink (e.g., checks printed on home computers that do not use magnetic ink cannot be read by MICR systems).

Once the characters are magnetically read, well established MICR-based algorithms are implemented to identify each E13B character. MICR-based systems and algorithms are described, for example, in U.S. Pat. No. 6,243,504 B1, "Integrated Magnetic Ink Character Recognition System and Method Therefor," issued on Jun. 5, 2001 to Kruppa, and U.S. Pat. No. 5,026,974, Method for Recognizing the Leading Edge of a Character in E13B Font," issued on Jun. 25, 1991 to Franlin et al., which are hereby incorporated by reference.

While most MICR systems utilize a single gap read head that provides marginal read-rate performance, IBM Corporation's 3890 system utilizes a multigap read head, along with a multigap MICR algorithm, to provide higher performance. Although multigap MICR systems generally provide superior read rates (i.e., low error rate), the systems are relatively expensive since they require multigap magnetic read heads.

A potential solution to the aforementioned problems is to use multiple lower cost recognition engines that perform independent analysis of the characters being read (referred to herein as "a multi-voting character recognition system"). A relatively inexpensive recognition engine may be implemented using known OCR (optical character reader) technology. OCR technology reads characters electro-optically and therefore does not require magnetic ink.

However, in order to provide a high level of accuracy, each character recognition engine must implement a unique feature set or feature vector for identifying characters. Unfortunately, the costs of developing, testing, and implementing new feature sets may be significant. Accordingly, a need exists for independent feature sets for recognizing characters in a multi-voting recognition system that can utilize low cost technologies, such as OCR.

SUMMARY OF THE INVENTION

The present invention addresses the above mentioned problems, as well as others, by providing an OCR system that utilizes a MICR-based algorithm to identify E13B characters. In a first aspect, the invention provides a character recognition system, comprising: an optical character reader system for collecting character data by electro-optically scanning printed characters; a conversion system for converting the character data to a Magnetic Ink Character Recognition (MICR) format; and a recognition engine for interpreting the converted character data using a MICR algorithm.

In a second aspect, the invention provides a method for performing character recognition, comprising: collecting character data by electro-optically scanning printed characters; converting the character data to a Magnetic Ink Character Recognition (MICR) format; and interpreting the converted character data using a MICR algorithm.

In a third aspect, the invention provides a program product stored on a recordable medium for performing character recognition, comprising: means for accessing character data collected by an electro-optical scanning system; means for converting the character data to a Magnetic Ink Character Recognition (MICR) format; and means for interpreting the converted character data using a MICR algorithm.

In a fourth aspect, the invention provides a multi-voting character recognition engine for analyzing an inputted set of printed characters, comprising: a plurality of character recognition systems, wherein each character recognition system independently analyzes the inputted set of printed characters, and wherein one of the character recognition systems includes: an optical character reader system for collecting character data by electro-optically scanning the printed characters; a conversion system for converting the character data to a Magnetic Ink Character Recognition (MICR) format; and a recognition engine for interpreting the converted character data using a MICR algorithm; and a voting system for combining results from each of the plurality of character recognition systems and determining a recognized set of characters.

BRIEF DESCRIPTION OF THE DRAWINGS

An exemplary embodiment of the present invention will hereinafter be described in conjunction with the appended drawings, where like designations denote like elements, and wherein.

DETAILED DESCRIPTION OF THE INVENTION

Figure 1:
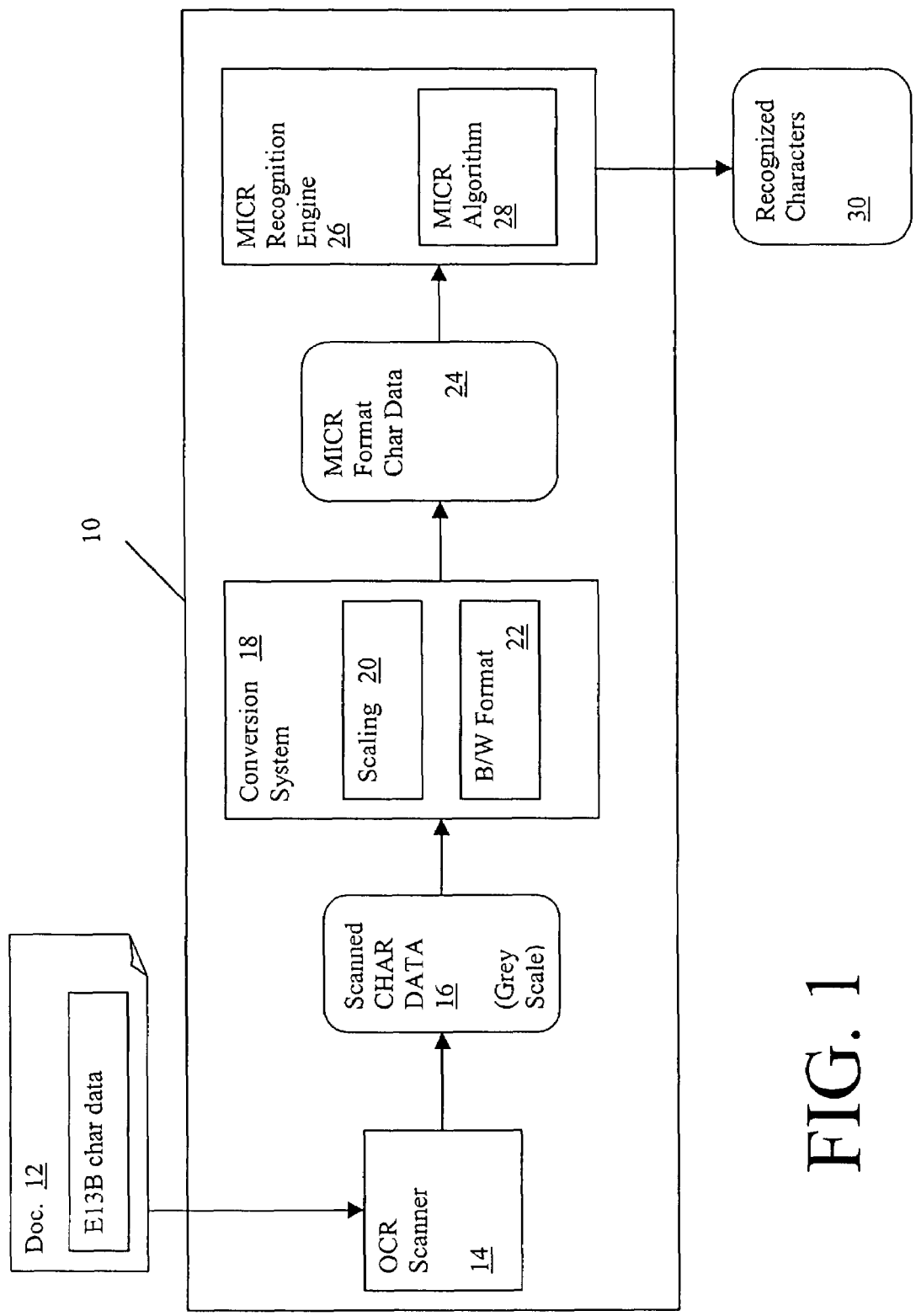
FIG. 1 depicts a block diagram of a MICR-based OCR system in accordance with the present invention.

Referring now to the drawings, FIG. 1 depicts a character recognition system 10 that outputs a set of recognized characters 30 based on an inputted document 12 having character data printed in an E13B font. As noted above, E13B is commonly used on checks and the like to identify account numbers, routing information, check numbers, etc. As described below, character recognition system 10 utilizes a MICR-based OCR technology that provides a unique feature set for recognizing E13B character data.

Character recognition system 10 comprises an OCR scanner 14, a conversion system 18, and a MICR recognition engine 26. OCR scanner 14 may utilize any well-known electro-optical scanning technology to read in E13B character data on document 12 and generate scanned character data 16. The scanned character data may be saved at any density and using any format. In this exemplary embodiment, the scanned character data 16 is scanned by OCR scanner 14 in a grey-scale format at a pel (pixel element) density of between 200 and 600 dpi (dots per inch), which is typical for today's electrooptical scanner technology.

Conversion system 18 converts the scanned character data 16 (in a non-MICR format) into a MICR format character data 24. Specifically, the MICR format character data 24 has the equivalent spatial resolution and density as if captured by an actual multigap MICR read head. To achieve this, conversion system 18 comprises a scaling system 20, and a black and white format system 22. Scaling system 20 scales the resolution of the scanned character data to approximately 0.33 millimeters/pixel in the horizontal dimension and 0.43 millimeters/pixel in the vertical dimension. Scaling system 20 may utilize one or more techniques for changing the resolution (an therefore the size) of an image. Scaling techniques are well known in the art, and include, for example, U.S. patent application Ser. No. 10/062066, now U.S. Pat. No. 6,985,642, entitled "IMAGE SIZE REDUCTION METHOD AND SYSTEM," filed on Jan. 31, 2002 by Prakash, which is hereby incorporated by reference.

In addition to the scaling operation performed by scaling system 20, black and white format system 20 converts scanned character data 16 from a grey-scale format to a black and white format. The result is a set of MICR format character data 24 that has the equivalent specifications of data obtained by, e.g., a 3890 system of IBM corporation that uses a multigap MICR read head.

The MICR format character data 24 is then inputted to a MICR recognition engine 26 that analyzes the data and outputs a set of recognized characters 30. MICR recognition engine 26 may include any known MICR algorithm 28 for interpreting the MICR format character data 24. As noted above, such MICR algorithms are well known in the art and therefore will not be described in further detail herein. Accordingly, the present embodiment utilizes standard OCR scanning techniques in combination with well known MICR algorithms to provide a unique feature set for recognizing E13B data.

It should be recognized that while the MICR format character data 24 of the present embodiment comprises specifications based on a multigap MICR read head, the MICR format character data 24 could be based on specifications of a single gap MICR read head.

Figure 2:
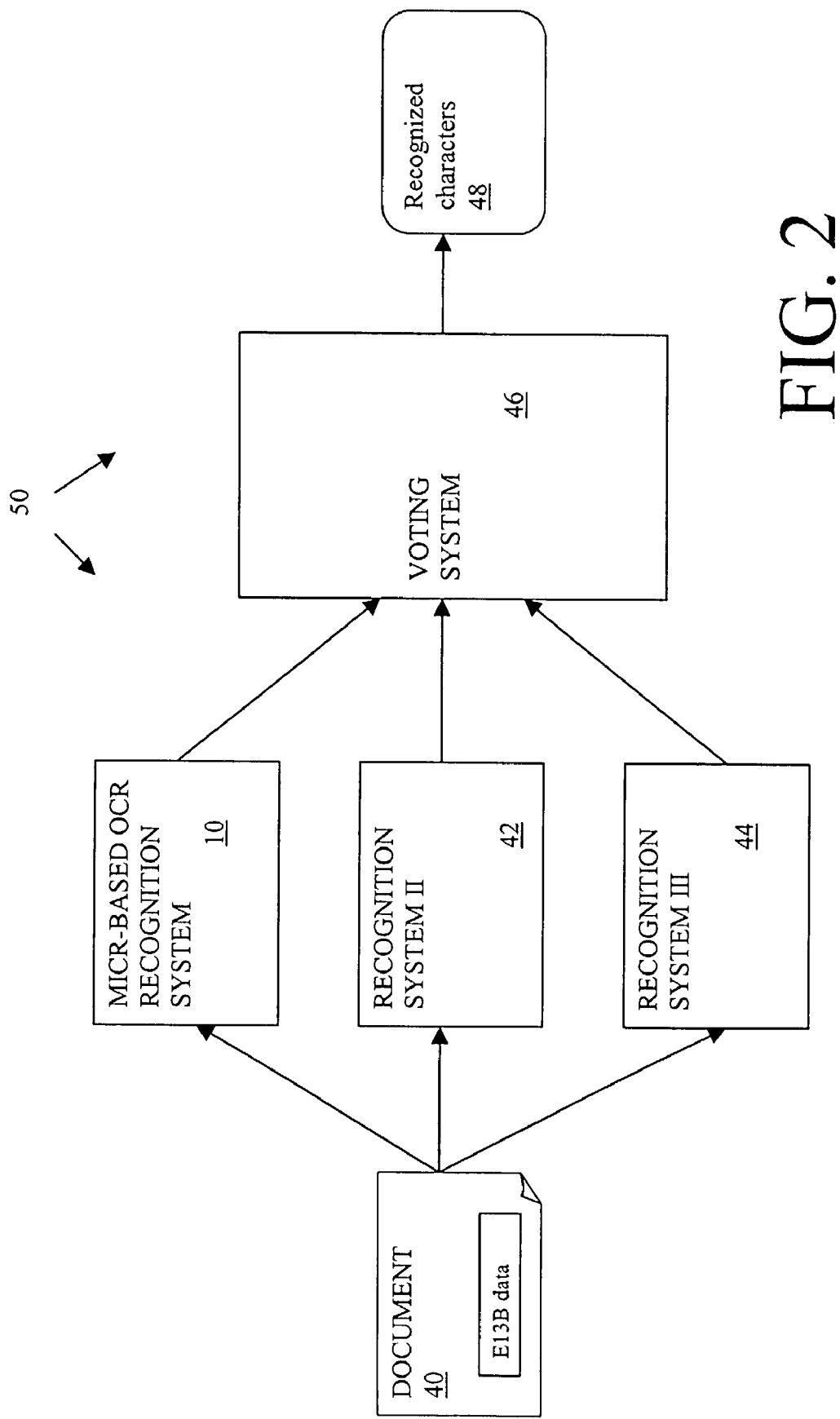
FIG. 2 depicts a block diagram of a multi-voting character recognition engine in accordance with the present invention.

Referring now to FIG. 2, a multi-voting character recognition system 50 is shown that utilizes multiple recognition systems 10, 42, 44. In this case, each of the recognition systems reads in E13B character data from document 40. One of the recognition systems comprises a MICR-based OCR recognition system 10, as described in FIG. 1. The remaining recognition systems 42, 44 may utilize any other known engines/feature sets for identifying E13B character data. A voting system 46 obtains the results from each system 10, 42, 44, and outputs a final set of recognized characters 48 based on some voting logic implemented by voting system 46. For instance, if two of the three systems identifies a character as an "8" and the other system identifies the same character as a "3," then the voting system may determine that the character was indeed an "8" based on a 2-1 vote. Obviously, any type of voting scheme may be utilized, and any number of recognition systems may be implemented without departing from the scope of the invention.

It is understood that the present invention can be realized in hardware, software, or a combination of hardware and software. Moreover, any necessary computer systems for implementing the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls a computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A character recognition system, comprising:
an optical character reader system for collecting character data by electro-optically scanning printed characters;
a conversion system for converting the character data to a Magnetic Ink Character Recognition (MICR) format from a non-MICR format; and
a recognition engine for interpreting the converted character data using a MICR algorithm;
wherein the conversion system scales the character data to a pel density associated with digitalized data obtained by a character recognition device using a multigap MICR read head.

2. The character recognition system of claim 1, wherein the optical character reader system scans at a pel density in a range of approximately 200 to 600 dpi.

3. The character recognition system of claim 1, wherein the character data is stored in a grey scale image format.

4. The character recognition system of claim 3, wherein the conversion system converts the grey scale image format to a black and white image format.

5. The character recognition system of claim 1, wherein the conversion system scales the character data to approximately 0.33 millimeters/pixel in a horizontal dimension and 0.43 millimeters/pixel in a vertical dimension.

6. The character recognition system of claim 1, wherein the printed characters are printed in an E13B font.

7. A method for performing character recognition, comprising:
collecting character data by electro-optically scanning printed characters;
converting the character data to a Magnetic Ink Character Recognition (MICR) format from a non-MICR format; and
interpreting the converted character data using a MICR algorithm;

wherein the converting step scales the character data to a pel density associated with digitalized data obtained by a character recognition device using a multigap MICR read head.

8. The method of claim 7, wherein the character data is scanned at a pel density in a range of approximately 200 to 600 dpi.

9. The method of claim 7, wherein the collection step stores the character data in a grey scale image format.

10. The method of claim 9, wherein the converting step converts the grey scale image format to a black and white image format.

11. The method of claim 7, wherein the converting step scales the character data to approximately 0.33 millimeters/pixel in a horizontal dimension and 0.43 millimeters/pixel in a vertical dimension.

12. The method of claim 7, wherein the printed characters are printed in an E13B font.

13. A program product stored on a computer readable medium for performing character recognition, comprising:
   means for accessing character data collected by an electro-optical scanning system;
   means for converting the character data to a spatial resolution and density as if captured by a Magnetic Ink Character Recognition (MICR) read head; and
   means for interpreting the converted character data using a MICR algorithm;
   wherein the converting means scales the character data to a pel density associated with digitalized data obtained by a character recognition device using a multigap MICR read head.

14. The program product of claim 13, wherein the character data comprises a pel density in a range of approximately 200 to 600 dpi.

15. The program product of claim 13, wherein the converting means scales the character data to approximately 0.33 millimeters/pixel in a horizontal dimension and 0.43 millimeters/pixel in a vertical dimension.

16. The program product of claim 13, wherein the converting means converts a grey scale image format to a black and white image format.

17. The program product of claim 13, wherein the character data collected by the electro-optical scanning system comprises characters printed in an E13B font.

18. A multi-voting character recognition engine for analyzing an inputted set of printed characters, comprising:
   a plurality of character recognition systems, wherein each character recognition system independently analyzes the inputted set of printed characters, and wherein one of the character recognition systems includes:
   an optical character reader system for collecting character data by electro-optically scanning printed characters;
   a conversion system for converting the character data to a Magnetic Ink Character Recognition (MICR) format;
   a recognition engine for interpreting the converted character data using a MICR algorithm; and
   a voting system for combining results from each of the plurality of character recognition systems and determining a recognized set of characters;
   wherein the conversion system scales the character data to a pel density associated with digitalized data obtained by a character recognition device using a multigap MICR read head.

19. The multi-voting character recognition engine of claim 18, wherein the inputted set of printed characters are printed in an E13B font.

* * * * *